(12) United States Patent
Scalerandi

(10) Patent No.: US 11,299,303 B2
(45) Date of Patent: Apr. 12, 2022

(54) FOOD ARTICLE LOADING SYSTEM AND METHOD

(71) Applicant: METALQUIMIA, SAU, Girona (ES)

(72) Inventor: Federico Scalerandi, Vimercate (IT)

( * ) Notice: Subject to any disclaimer, the term of this patent is extended or adjusted under 35 U.S.C. 154(b) by 0 days.

(21) Appl. No.: 16/412,869

(22) Filed: May 15, 2019

(65) Prior Publication Data

US 2019/0359359 A1    Nov. 28, 2019

Related U.S. Application Data

(60) Provisional application No. 62/675,515, filed on May 23, 2018.

(51) Int. Cl.
| | | |
|---|---|---|
| *B65B 5/06* | (2006.01) | |
| *B65B 19/34* | (2006.01) | |
| *B65B 25/06* | (2006.01) | |
| *B65B 5/10* | (2006.01) | |

(52) U.S. Cl.
CPC ............. *B65B 5/068* (2013.01); *B65B 5/108* (2013.01); *B65B 19/34* (2013.01); *B65B 25/065* (2013.01); *B65B 25/068* (2013.01)

(58) Field of Classification Search
CPC ......... B65B 5/068; B65B 5/108; B65B 19/34; B65B 25/065; B65B 25/068
USPC .......................................................... 53/444
See application file for complete search history.

(56) References Cited

U.S. PATENT DOCUMENTS

| | | | | |
|---|---|---|---|---|
| 4,386,490 A | * | 6/1983 | Griffith | ................. B65B 35/405 |
| | | | | 53/148 |
| 4,733,518 A | * | 3/1988 | Griesdorn | ............... B65B 19/34 |
| | | | | 53/148 |
| 5,388,385 A | * | 2/1995 | Phelps | .................... B65B 19/34 |
| | | | | 414/746.8 |
| 5,810,150 A | * | 9/1998 | Martin | ............... B65G 47/1471 |
| | | | | 198/397.06 |
| 5,893,259 A | * | 4/1999 | Posge | ..................... B65B 57/16 |
| | | | | 53/448 |

(Continued)

OTHER PUBLICATIONS

PCT, International Search Report issued by International Searching Authority; Patent Application No. PCT/EP2019/060283; (dated Sep. 6, 2019).

*Primary Examiner* — Thanh K Truong
*Assistant Examiner* — David G Shutty
(74) *Attorney, Agent, or Firm* — Eugenio J. Torres-Oyola; Victor M. Rodriguez-Reyes; Rafael Rodriguez-Muriel

(57) ABSTRACT

A food article loading system including a shuttle conveyor mounted for reciprocal movement having a first paddle belt for receiving food articles, and upper and lower drives engaging the upper and lower passes of the first paddle belt; a loading head having a second paddle belt for receiving the food articles from the first paddle belt lower pass; a slide gate for receiving groupings of food articles from the loading head; and a control for independently actuating the upper and lower drives to operate at selected speeds, to cause rotation of the first belt and the shuttle conveyor to reciprocate longitudinally to receive and retain a first predetermined number of the food articles, deposit a second predetermined number of the elongate food articles onto the second belt at a selected frequency, and selectively open the slide gate to allow groupings of food articles to fall into receptacles.

18 Claims, 14 Drawing Sheets

(56) References Cited

U.S. PATENT DOCUMENTS

| | | | | |
|---|---|---|---|---|
| 6,141,943 | A * | 11/2000 | Hart | B65B 5/106 |
| | | | | 198/418.6 |
| 6,343,688 | B1 * | 2/2002 | McKinlay | A01K 31/165 |
| | | | | 119/337 |
| 7,581,634 | B2 * | 9/2009 | Hart | B65G 47/52 |
| | | | | 198/418.6 |
| 7,757,462 | B2 * | 7/2010 | Harrison | B65B 19/34 |
| | | | | 53/447 |
| 8,215,087 | B2 * | 7/2012 | Malenke | B65B 35/24 |
| | | | | 53/447 |
| 9,499,352 | B2 * | 11/2016 | Le Paih | B65G 47/261 |
| 9,944,471 | B2 * | 4/2018 | Singer | B65B 35/36 |
| 10,071,534 | B2 * | 9/2018 | Pradelli | B65B 61/24 |
| 2004/0079049 | A1 * | 4/2004 | Borderi | B65G 47/082 |
| | | | | 53/148 |
| 2004/0195074 | A1 | 10/2004 | Iwasa et al. | |
| 2007/0045083 | A1 | 3/2007 | Hart et al. | |
| 2013/0105035 | A1 * | 5/2013 | Henriques | B65B 19/34 |
| | | | | 141/1 |

* cited by examiner

FOOD ARTICLE LOADING SYSTEM AND METHOD

TECHNICAL FIELD

The present disclosure relates to systems and methods for loading discrete articles into receptacles, and more particularly, to systems and methods for loading food articles into receptacles.

BACKGROUND

Discrete food articles, such as frankfurters and bratwurst, are sold in packages in which the articles are arranged side by side in parallel. In some packages, there is only one layer; in other packages, most often for frankfurters, the food articles are stacked in two or more layers. Whether packaged in a single layer, or in two or more layers, each layer of such food articles may consist of four, five or six items.

It is not economical to provide a single packaging facility with a sufficient number of food article loading systems to accommodate a variety of packaging configurations, especially with respect to varying the number of food articles for each layer. Consequently, food article loading systems are designed to be configurable to provide a variety of food article arrangements, both with respect to the number of food articles for each layer and the number of layers of food articles.

Another factor that must be accommodated by food article loading systems is that the food articles typically are placed into independent rotary aligners, which feed the food articles onto string conveyors that transport the food articles end-to-end rapidly and continuously into the loading system without interruption. The loading system must be designed to receive the continuous stream of food articles, group them into preselected groupings of, for example five articles, then place them into correspondingly shaped receptacles. The food article loading system therefore must accumulate the continuous stream of incoming food articles as the loading system arrange food articles received earlier into preselected groups and deposit them into their respective receptacles.

There are current designs for food article loading systems that can accommodate a continuous stream of incoming food articles while arranging them into preselected groupings and depositing the groupings into receptacles. However, such loading systems have a relatively large footprint and therefore require an inordinate amount of space on the packing room floor. Since the packing operation must be conducted in a sealed room with a strictly controlled environment with regard to filtered air, positive air pressure, and cleanliness, space is at a premium.

In addition, current designs may be difficult to clean and to reconfigure to accommodate different packing configurations. Such designs may require replacing and adjusting many components, which results in undesirable downtime, not only for the loading system itself, but for the entire upstream food article processing line.

Accordingly, there is a need for a food article loading system and method that accommodates a high and continuous infeed rate, is easily reconfigurable, and operates on a minimal packing room floor footprint.

SUMMARY

The disclosed food article loading system and method overcomes the disadvantages of current designs. The loading system is scalable, which allows one, two or several independently operating loading systems to be employed. The design of the disclosed loading system allows minimal spacing between loading systems, which minimizes the packing room floor footprint required. The individual components of the disclosed food article loading system are modularized, which facilitates their rapid removal from the system, which enables reconfiguration with minimal system downtime.

In one embodiment, a food article loading system includes a housing; a shuttle conveyor having a first belt with a first plurality of paddles for receiving individual food articles, the first belt having an upper pass and a lower pass, the shuttle conveyor mounted on the housing for relative longitudinal, reciprocal movement; an upper drive engaging the upper pass of the shuttle conveyor; a lower drive engaging the lower pass of the shuttle conveyor; a loading head having a second belt with a second plurality of paddles for receiving the food articles from the lower pass of the shuttle conveyor, the second belt having an upper pass and a lower pass; and a control for actuating each of the upper drive and the lower drive to operate at a selected speed, thereby causing the first belt to rotate about a circular path and the shuttle conveyor to reciprocate longitudinally to receive and retain a first predetermined number of the food articles, and to deposit a second predetermined number of the elongate food articles onto the second belt at a selected frequency.

In another embodiment, a food article loading system includes an accumulator for receiving and accumulating individual food articles thereon, and discharging food articles therefrom; a loading head having a belt with a plurality of paddles for receiving the food articles from the accumulator, the belt having an upper pass and a lower pass, the loading head having a front guide at a food article receiving end and a rear guide, the front guide having a larger radius of curvature than a radius of curvature of the rear guide, and the second belt of the loading head extends around the front guide and the rear guide such that a spacing between adjacent ones of the paddles of the second belt splay outwardly at a point where the second belt first engages the front guide to receive the food articles discharged from the accumulator conveyor; and a control for actuating each of the accumulator and the belt of the loading head to operate at selected speeds, thereby causing the accumulator to receive and retain a predetermined number of food articles for a predetermined time interval, and to deposit a second predetermined number of food articles onto the second belt at a selected frequency, so that the loading head receives the food articles in the paddles of the second belt in predetermined spaced groupings.

In yet another embodiment, a method for loading food articles into receptacles includes receiving and accumulating the food articles in an accumulator; discharging food articles from the accumulator in predetermined, spaced groupings into a loading head; receiving the food articles seriatim in preselected groupings from the accumulator at a food article receiving end in paddles of an endless belt of a loading head extending about a front guide and a rear guide, the front guide having a larger radius of curvature than a radius of curvature of the rear guide, and a spacing between adjacent ones of the paddles of the endless belt splay outwardly at a point where the endless belt first engages the front guide to define a food article receiving opening to receive the food articles discharged from the accumulator; conveying the food articles in the preselected groupings on the belt to a lower pass of the belt to an upper slide gate, and synchronizing the movement of the belt relative to the movement of the first belt to space the food articles in the preselected groupings on the upper slide gate; opening the upper slide gate to allow a first preselected collection of groupings of food articles to fall into a divider tray that maintains the preselected groupings supported upon a lower slide gate; and opening the lower slide gate to allow the first preselected collection of groupings of food articles to fall into discrete containers.

Other objects and advantages of the disclosed food article loading system and method will be apparent from the following description, the accompanying drawings, and the appended claims.

DETAILED DESCRIPTION

Figure 1:
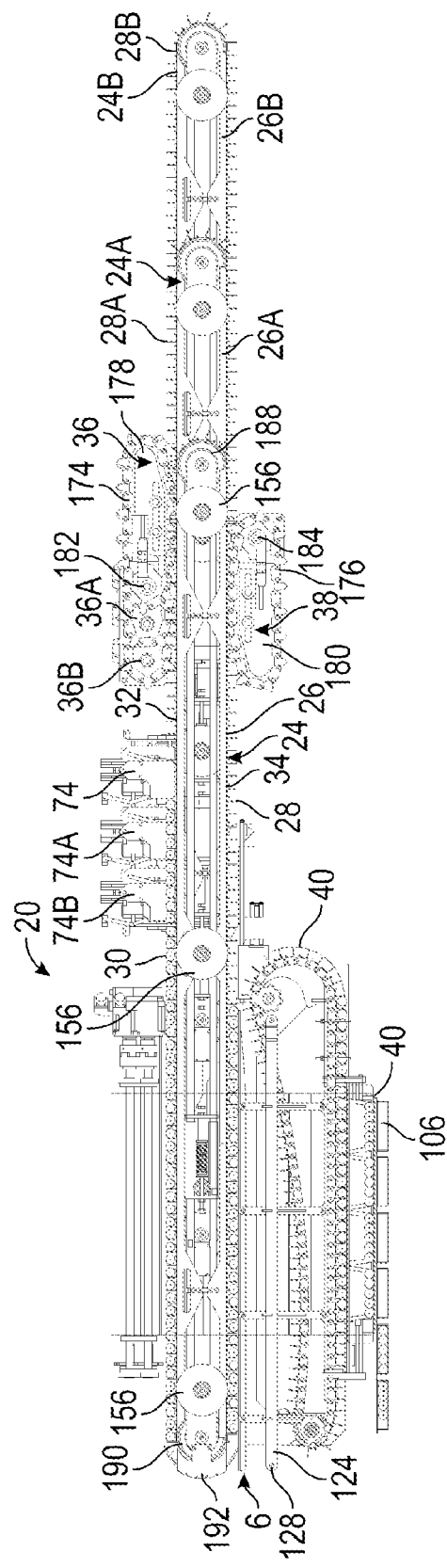
FIG. 1 is a side elevation of the disclosed food article loading system, with the housing removed for clarity.

As shown in FIGS. 1, 2, 3, and 4, the disclosed food article loading system, generally designated 20, includes a housing 22 and a shuttle conveyor 24 having a first belt 26 with a first plurality of paddles 28 for receiving individual food articles 30. The paddles are shown in greater detail in FIGS. 5A, 5B, and 5C and described infra. The food article loading system 20 is scalable and is shown in the figures as having three independently operable shuttle conveyors 24, 24A, and 24B, each having a first belt 26 with a first plurality of paddles 28. It is within the scope of the disclosure to provide a food article loading system 20 with only one, two, or more than three shuttle conveyors 24. The following description will be directed to shuttle conveyor 24 in particular, it being understood that the description of the structure and function of shuttle conveyor 24 applies equally to shuttle conveyors 24A and 24B.

Figure 2:
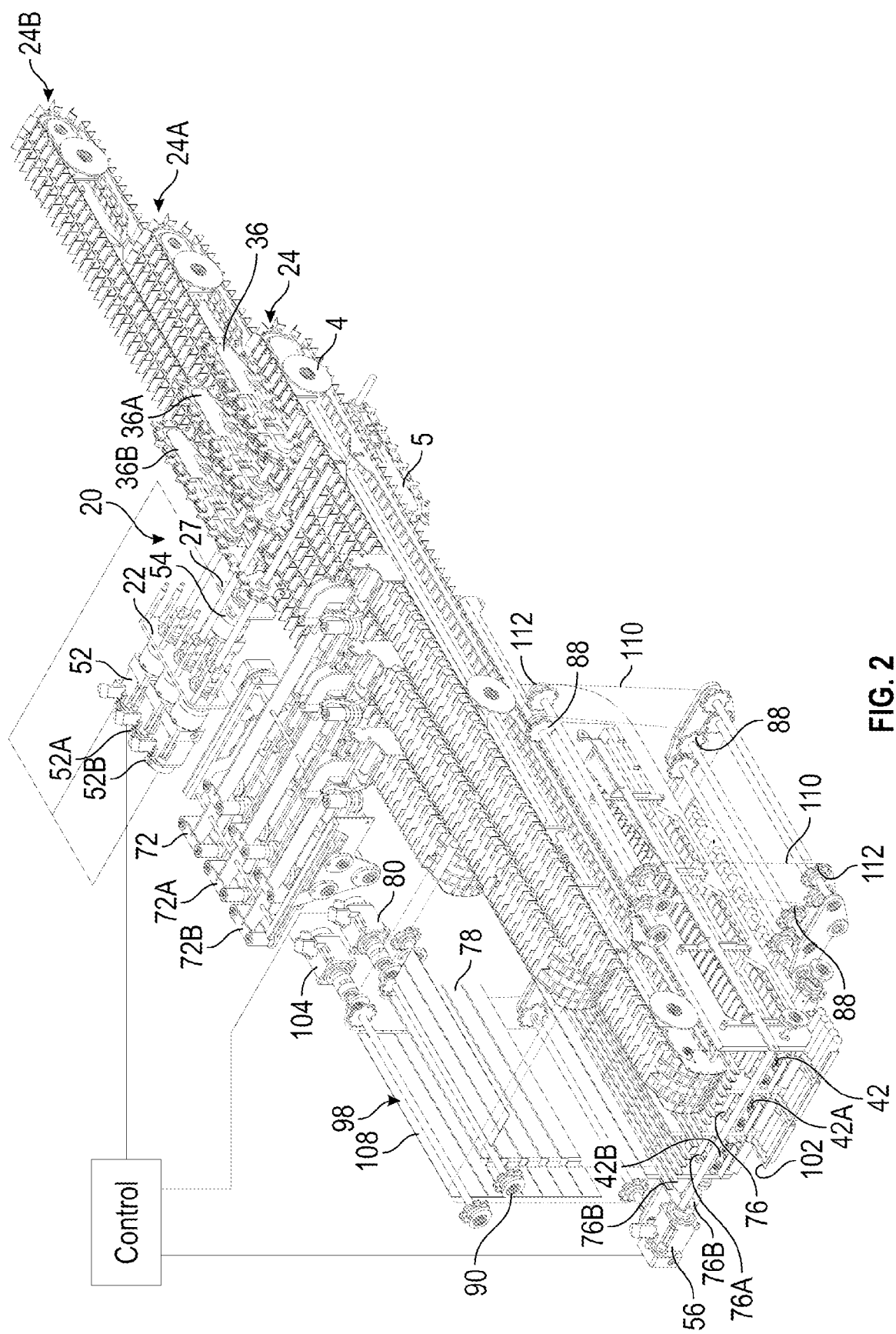
FIG. 2 is a perspective view from above of the food article loading system of FIG. 1, with the housing removed for clarity.
Figure 6:
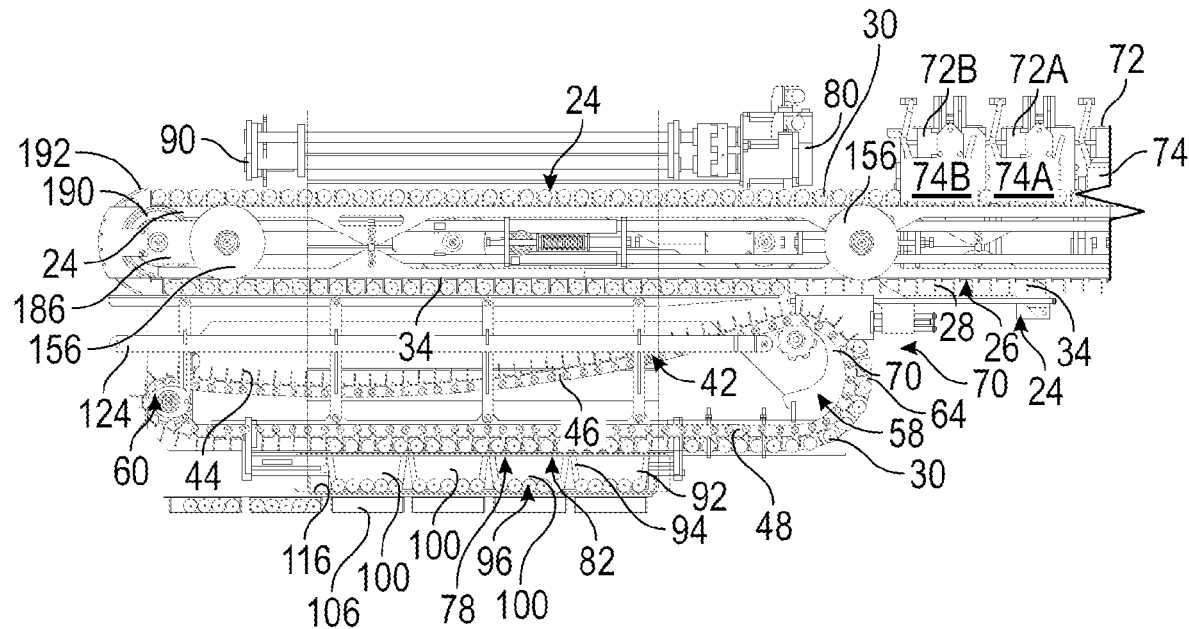
FIG. 6 is a detail side elevation showing the loading head and the slide gates of the food article loading system of FIG. 1.

In an exemplary embodiment, the first belt 26 is an endless belt having an upper pass 32 and a lower pass 34. The shuttle conveyor 24 is mounted on the housing 22 for longitudinal, reciprocal movement relative to the housing. An upper drive 36 engages the upper pass 32 of the shuttle conveyor 24, and a lower drive 38 engages the lower pass 34 of the shuttle conveyor. As also shown in FIG. 6, a loading head 40 includes a second belt 42 with a second plurality of paddles 44 (see also FIGS. 8 and 9) that receive the food articles 30 from the lower pass 34 of the shuttle conveyor 24. In an exemplary embodiment, the second belt 42 is an endless belt having an upper pass 46 and a lower pass 48. As shown in FIG. 2, in embodiments the loading head 40 may be scalable, and have belts 42A, 42B that are constructed, include the same components, and operate similarly to belt 42. Accordingly, the description will be limited to belt 42, with the understanding that it applies equally to belts 42A, 42B.

The system 20 includes a control, which in embodiments is programmed to actuate each of the upper drive 36 and the lower drive 38 to operate at preselected speeds, thereby causing the first belt 26 to rotate about a circular path and the shuttle conveyor 24 to reciprocate longitudinally (i.e., to the left and to the right in FIGS. 1, 2, and 3, relative to the housing 22) to receive and retain a first predetermined number of the food articles 30 (see FIGS. 1 and 2), and to deposit a second predetermined number of the elongate food articles onto the second belt 42 (see FIG. 6) at a selected frequency. As shown in FIG. 2, the control 50 is connected to control actuators 52, 52A, 52B that drive upper drives 24, 24A, 24B, respectively, actuator 54 to drive lower drive 38, and actuator 56 to control loading head 40. In embodiments, actuators 52, 54, and 56 are electric motors, in particular stepper motors.

In exemplary embodiments, as shown best in FIG. 6, the loading head 40 includes a front guide 58 at a food article receiving end and a rear guide 60, in which the front guide has a larger radius of curvature than a radius of curvature of the rear guide. The second belt 42 of the loading head 40 extends around the front guide 58 and the rear guide 60 such that a spacing between adjacent ones of the paddles 44 of the second belt splay outwardly away from each other at a point 62 (see FIG. 7A) where the second belt first engages the front guide to receive the food articles 30 from the lower pass 34 of the first belt 26 of the shuttle conveyor 24.

In embodiments, the loading head 40 includes a slide guide 64 extending about and spaced from the front guide 58 to retain food articles 30 in the paddles 44 of the second belt 42 as the paddles of the second belt pass between the front guide and the slide guide. An upper portion of the slide guide 64 forms a food article receiving opening 66 with the second belt (see FIG. 7A). The food article receiving opening 66 coincides with the point 62 where the second belt 42 first engages the front guide 58 to receive the food articles 30 from the lower pass 34 of the first belt 26.

In an exemplary embodiment, the rear guide 60 takes the form of a drive sprocket, and the front guide 58 includes an idler sprocket and fixed, arcuate guide plates 70. The loading head actuator 56 is connected to rotate the drive sprocket. In embodiments, the pitch of the paddles 28 of the first belt 26 (i.e., the distance between the same point on adjacent paddles) is greater than the pitch of the paddles 44 of the second belt 42 of the loading head 40. The larger pitch enables the first belt to receive food articles 30 from a feeding mechanism, such as string belt conveyors 72, 72A, 72B, which launch the food articles in end-to-end fashion toward pushers 74, 74A, 74B. The pushers 74, 74A, 74B are angled to deflect the food articles 30 downwardly to be received in the paddles 28 of the shuttle conveyors 24, 24A, 24B, respectively.

Figure 7A:
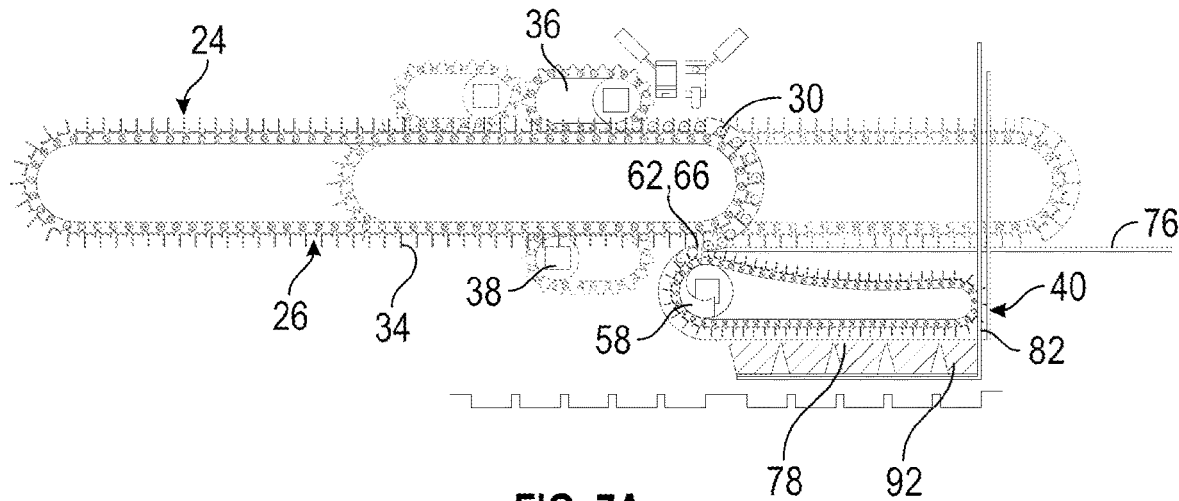
FIGS. 7A, 7B, 7C, 7D, 7E, 7F, 7G, 7H, 7I, 7J, 7K, and 7L are schematic side elevational views of the shuttle conveyor, loading head, and upper and lower slide gates of the food article loading system of FIG. 1, showing one example of a sequence of operation.
Figure 7B:
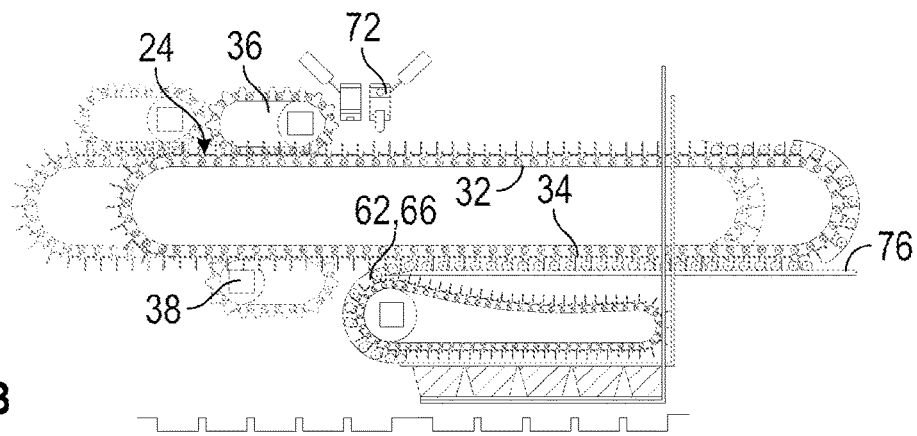
Figure 8:
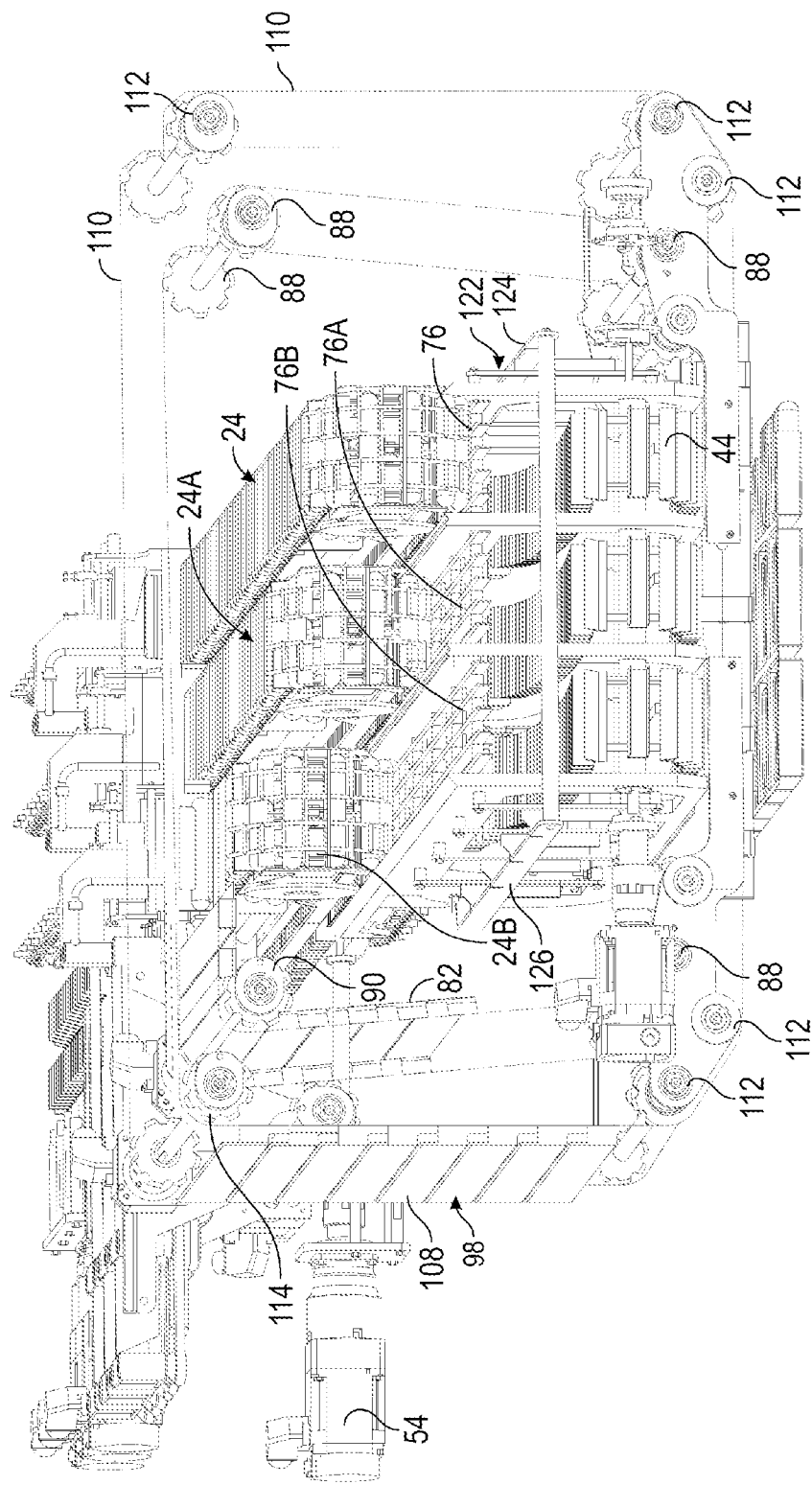
FIG. 8 is a detail end perspective view of the food article loading system of FIG. 1, shown without the housing.

In embodiments, as shown in FIGS. 7A and 8, horizontal flat cage 76 (also shown as horizontal flat cages 76A, 76B for shuttle conveyors 24A and 24B, respectively in FIG. 8) positioned beneath the lower pass 34 of the first belt 26 and spaced away from the first belt to retain the food articles 30 between the paddles 28 of the lower pass of the first belt. The horizontal flat cage 76 terminating at the food article receiving opening 66 of the loading head adjacent the slide guide 64 and forming the food article receiving opening 66 with the slide guide and the paddles 44 of the second belt.

As shown in FIGS. 2, 6, and 8, the loading system 20 includes an upper sliding gate 78 positioned below the lower pass 48 of the second belt 42 to receive the food articles 30 from the loading head 40. A first actuator 80, which may take the form of an electric stepper motor, is activated by the control 50 for alternately opening the upper sliding gate to allow the food articles 30 received from the loading head 40 and supported upon an upper surface 82 (see also FIG. 7A) of the upper sliding gate to fall downwardly, and closing the upper sliding gate to receive and collect additional ones of the food articles from the lower pass of the second belt of the loading head.

In an exemplary embodiment, the upper sliding gate 78 includes a plurality of first or upper gate panels 84 attached to and extending between parallel chain drives that include support chains which extend about idler sprockets 88 encircling a portion of the shuttle conveyor 24 and the loading head 40. The first actuator 80 is connected to rotate upper drive sprocket 90, which causes the upper gate panels 84 to move between an open position, shown in FIG. 8, to a closed, food article 30 supporting position, shown in FIG. 6.

The loading system 20 also may include a divider tray 92, fixed below the upper sliding gate 78, to receive food articles 30 from the upper sliding gate when the sliding gate is moved to the position shown in FIG. 8. The divider tray 92 may include dividers 94 for dividing the food articles 30 received from the loading head 40 and resting upon the upper surface 82 of the upper sliding gate 78 into predetermined groupings 96, for example, groupings of 5 food articles shown in FIG. 6. The predetermined grouping of food articles 30 is governed by the arrangement and number of dividers 94 in the divider tray 92. In embodiments, the divider tray 92 may be selected from among a number of divider trays 92, each having a different spacing of dividers 94. For example, the divider tray 92 shown in FIG. 6 may be replaced with a selected divider tray having dividers that arrange the received food articles 30 into groupings of 3 (for larger food articles), 4, 6, or more. The divider tray 92 also allows for receiving food articles 30 stacked in layers, for example 2 or 3 layers of 5 food articles in each layer.

In an embodiment, the divider tray 92 has an open bottom, and the system 20 includes a lower sliding gate 98, positioned below the divider tray 92, to support the food articles 30 received from the divider tray within the receptacles 100 defined by the dividers 94, and end walls 102 (see FIG. 2). The lower sliding gate 98 includes a second actuator 104 activated by the control 50 for alternately opening to allow the food articles 30 in the divider tray 92 to fall downwardly into individual packages 106 and closing to receive and collect the food articles from the loading head 40. In an exemplary embodiment, the lower sliding gate 98 includes a plurality of second or lower gate panels 108 attached to and extending between a parallel chain drive that includes support chains 110 which extend about idler sprockets 112 (see also FIG. 8) encircling a portion of the shuttle conveyor 24 and the loading head 40. The second actuator 104 is connected to rotate upper drive sprocket 114, which causes the lower gate panels 108 to move between an open position, shown in FIGS. 2 and 8, to a closed, food article 30 supporting position, shown in FIG. 6, in which the food articles are supported upon the upper surfaces 116 of the lower gate panels 108.

In an exemplary embodiment, the upper sliding gate 78 and the lower sliding gate 98 are oriented relative to the shuttle conveyor 24 and the loading head 40 to displace the upper and lower pluralities of surfaces 82, 108, respectively, sidewardly relative to a movement direction of the second belt 42 of the loading head 40. The first and second actuators 80, 104, respectively, are connected to their respective parallel chain drives to move the first and second pluralities of surfaces 82, 108 between their respective open and closed positions.

As shown in FIGS. 3, 4, 8, 9, and 10, housing 22 includes a pair of forward rails 118, 120. The shuttle conveyor 24 is movably mounted on the pair of forward rails 118, 120. The loading head 40 includes a frame 122 that supports the drive sprocket (FIG. 6), the idler sprocket 68, and the fixed guide plates 70. The frame 122 also supports the horizontal flat cages 76, 76A, and 76B, the upper sliding gate 78, and the lower sliding gate 98. The frame 122 is supported for slidable movement on the housing 22. In embodiments, the frame 122 includes side rails 124, 126 that extend from the rear of the frame and are joined by a grab handle 128. The side rails 124, 126 slidably engage and are supported by cylindrical bosses 129, which in embodiments may take the form of rollers, which are attached to side walls (not shown for clarity) of the housing 22 adjacent the frame 122.

In embodiments, the frame 122 includes a pair of rearward rails 130, 132 that are connected to and detachable from the pair of forward rails 118, 120 (FIG. 3) to form a pair of continuous shuttle rails 134, 136 for the relative longitudinal reciprocal movement of the shuttle conveyor 24. In the embodiment shown, the frame 122 also includes rearward rails 138, 140 for the longitudinal reciprocal movement of the shuttle conveyors 24A and 24B. The rearward rails 130, 132 for second belt 42 form the upper horizontal edges of side walls 142, 144 of the frame 122 of loading head 40. Similarly, the rearward rails 138, 140 form the upper horizontal edges of side walls 146, 148 of the frame 122.

In an embodiment, the pair of forward rails 118, 120 and the pair of rearward rails 130, 132 each include outwardly facing beveled bearing surfaces 150, 152. The rails 132, 138 each include an additional, opposing beveled bearing surface 154A, 154B. The bearing surfaces 152, 154A, and 152A, 154B each together form two parallel beveled bearing surfaces that meet to form V-shaped notches as the top surfaces of the side walls 144, 146. The side wall 148 includes beveled bearing surface 150B. The shuttle conveyor 24 includes pairs disk-shaped wheels 156 on either side that ride along the beveled bearing surfaces 150, 152 and support the shuttle conveyor, whereby the beveled bearing surfaces center the shuttle conveyor between the pair of forward rails 118, 120 and the pair of rearward rails 138, 140. Similarly, shuttle conveyor 24A includes pairs of disk-shaped wheels 156A that ride on bearing surfaces 154A, 152A, and shuttle conveyor 24B includes pairs of disk-shaped wheels 156B that ride on bearing surfaces 154B, 150B. The pairs of bearing surfaces 150, 152; 154A, 152A; and 154B, 150B extend the lengths of the shuttle rails 134, 136, and their counterparts 136A, 134A, 134B, 136B for shuttle conveyors 24A, 24B, respectively.

Figure 9:
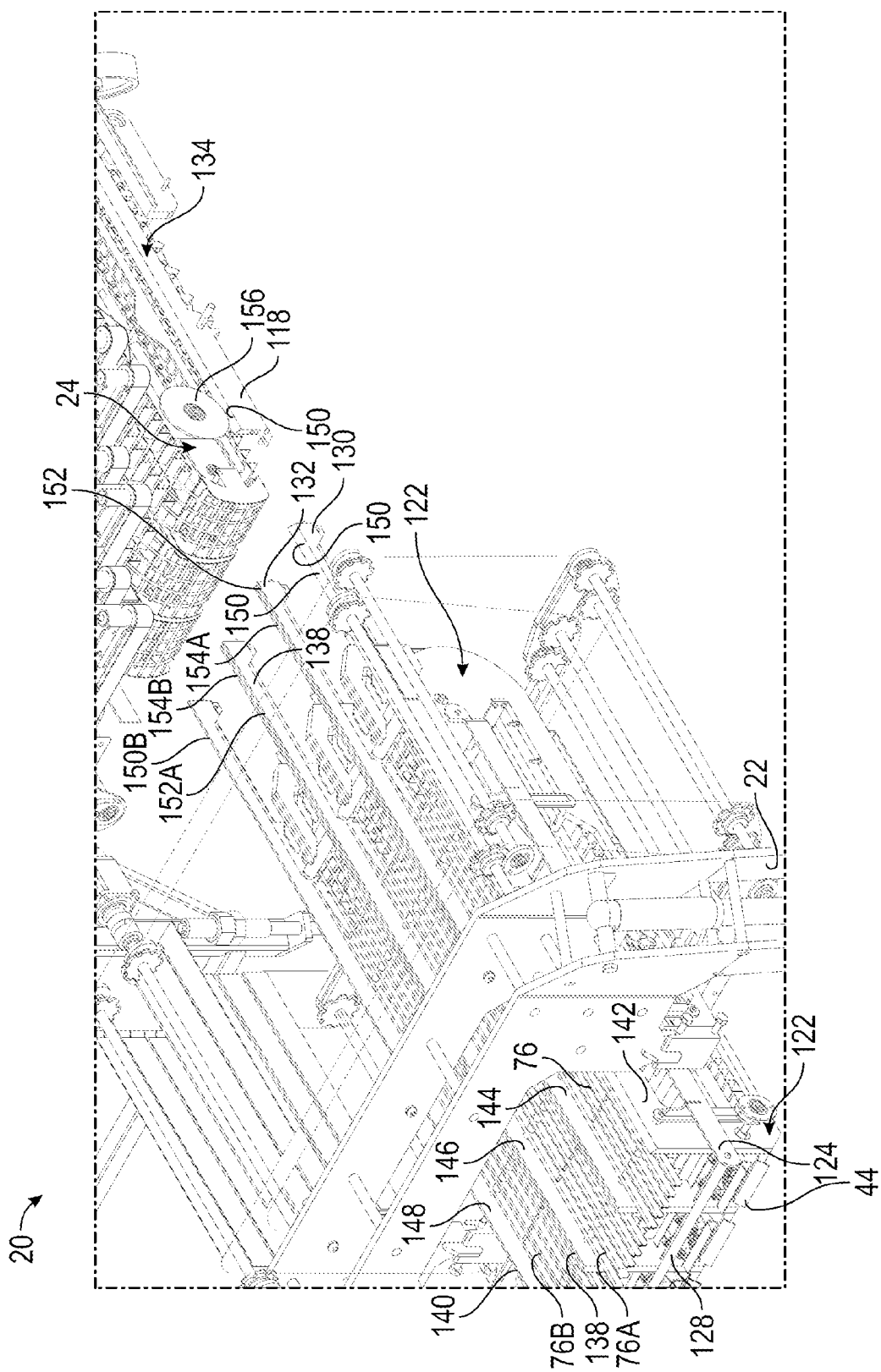
FIG. 9 is a detail perspective view showing the loading head detached from the forward portion of the housing of the food article loading system of FIG. 1.
Figure 10:
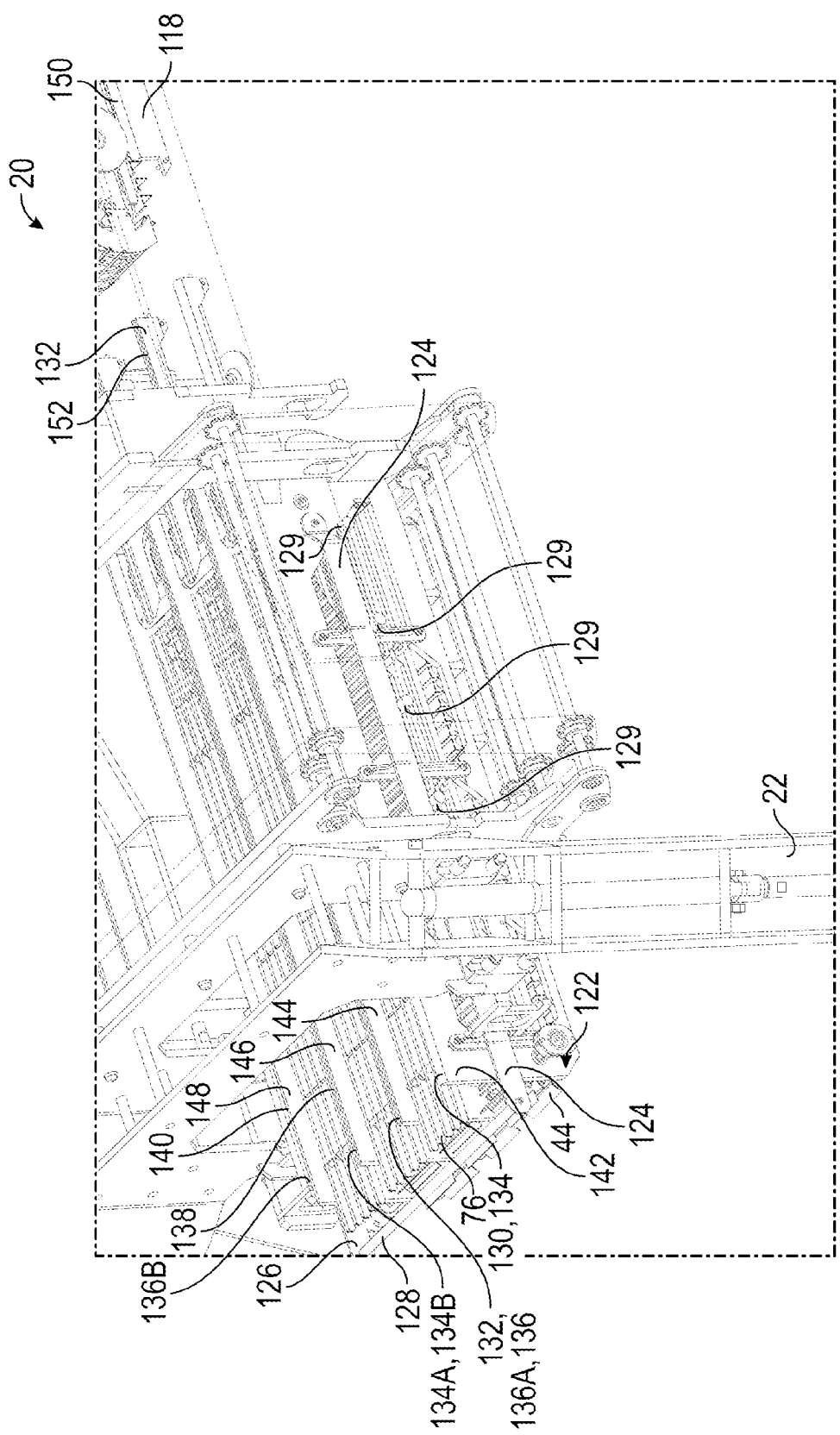
FIG. 10 is a detail perspective view showing the loading head detached from the forward portion of the housing, and partially removed from the rearward portion of the housing of the food article loading head of FIG. 1.

As shown in FIGS. 9 and 10, the loading head 40 is supported on the housing 22 by the frame 122, in which side rails 124 are supported by cylindrical bosses 129. The loading head 40 may be removed from the system 20 by disconnecting the rearward rails 130, 132 from the pair of forward rails 118, 120 (FIG. 3), grasping the grab handle 128, and sliding the loading head 40 rearwardly (i.e., to the left in FIGS. 9 and 10) from the housing 22. the loading head 40 is supported for this rearward sliding movement by the engagement of the side rails 124, 126 (FIG. 8) with the cylindrical bosses 129. The loading head 40 may be replaced in the same manner, by sliding the loading head 40 forwardly into the housing 22 and reattaching the rearward rails 130, 132 to the forward rails 118, 120. Similarly, for the embodiment shown, the rearward rails 136A, 134A, 134B, 136B for shuttle conveyors 24A, 24B, respectively are reattached to their respective forward rail counterparts. This feature not only facilitates cleaning and repair of the loading head 40 but facilitates reconfiguration of the system 20 to utilize a selected loading head similar to loading head 40 but having a second belt 42 with a different pitch and/or a different shape or size of paddle 44.

Figure 5A:
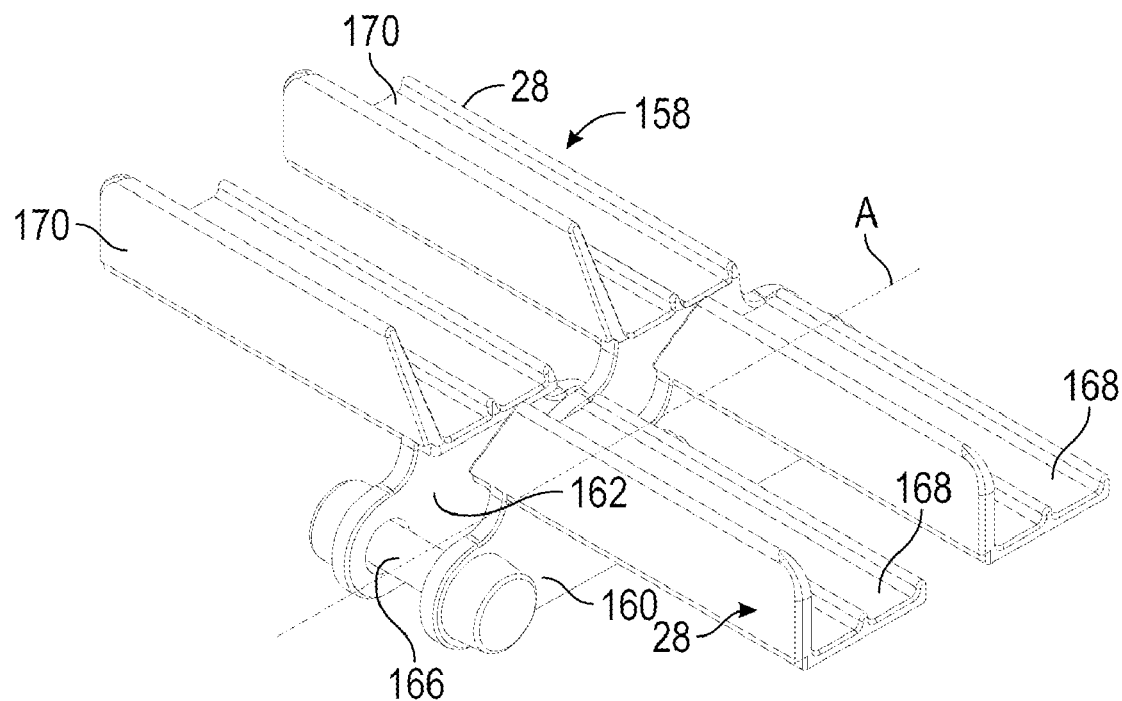
FIGS. 5A, 5B, and 5C are, respectively, a perspective view from above and behind, a side elevational view, and a perspective view from in front of a pair of paddles linked together to form a segment of the shuttle conveyor and loading head of the food article loading system of FIG. 1.
Figure 5B:
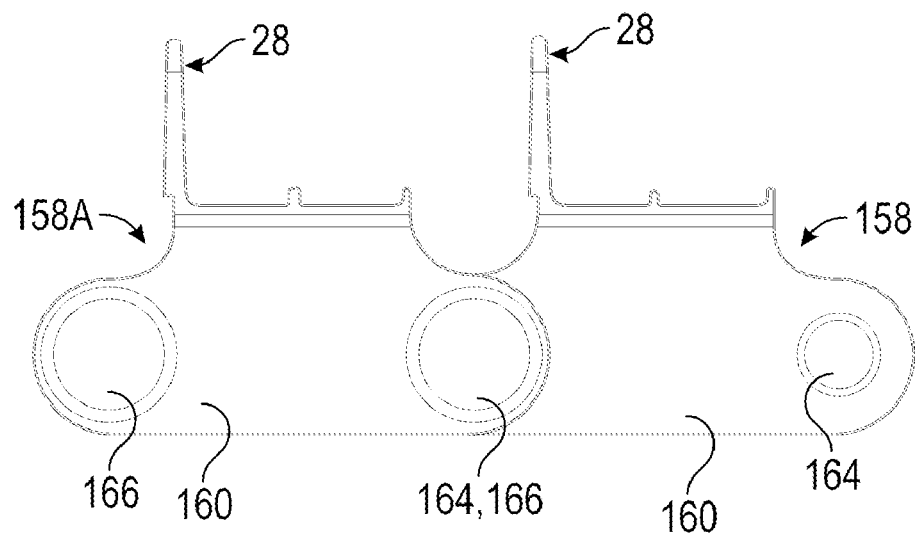
Figure 5C:
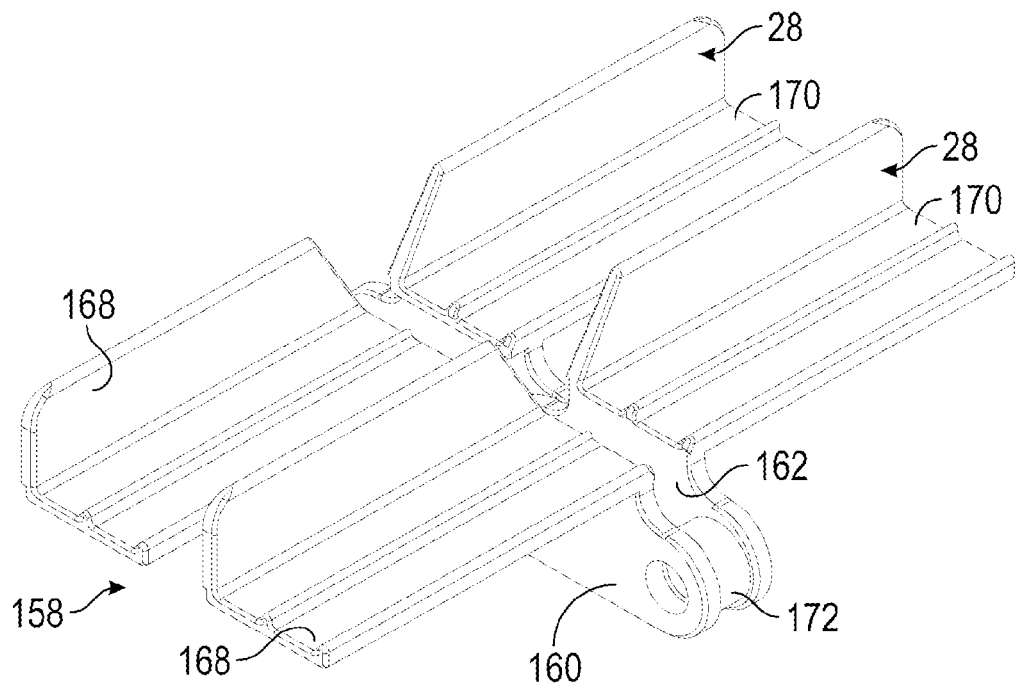

In an exemplary embodiment, as shown in FIGS. 5A, 5B, and 5C, the first belt 26 is a roller chain having a plurality of paddle units 158. Each paddle unit 158 includes a pair of opposing side plates 160, 162 parallel to and on either side of a belt longitudinal centerline A and joined by front and rear relatively rotatable rollers 164, 166, respectively. As shown in FIG. 5B, adjacent paddle units 158, 158A share and are interconnected by rollers, so that roller 164, 166 between and connecting paddle units 158, 158A is the rear roller 166 for paddle unit 158 and for front roller 164 for paddle unit 158A. Each side plate 160, 162 has a paddle segment 168, 170, respectively, extending sidewardly from the belt centerline A, such that the paddle segments of the opposing side plates align to form a paddle 28 that supports one of the food articles 30. In an exemplary embodiment, the first belt 26 is an endless belt comprised of interconnected paddle units 158. Optionally, the rollers 164, 166 may include a bushing 172 that maintains the side plates 160, 162 in a predetermined spaced relation with each other.

Figure 3:
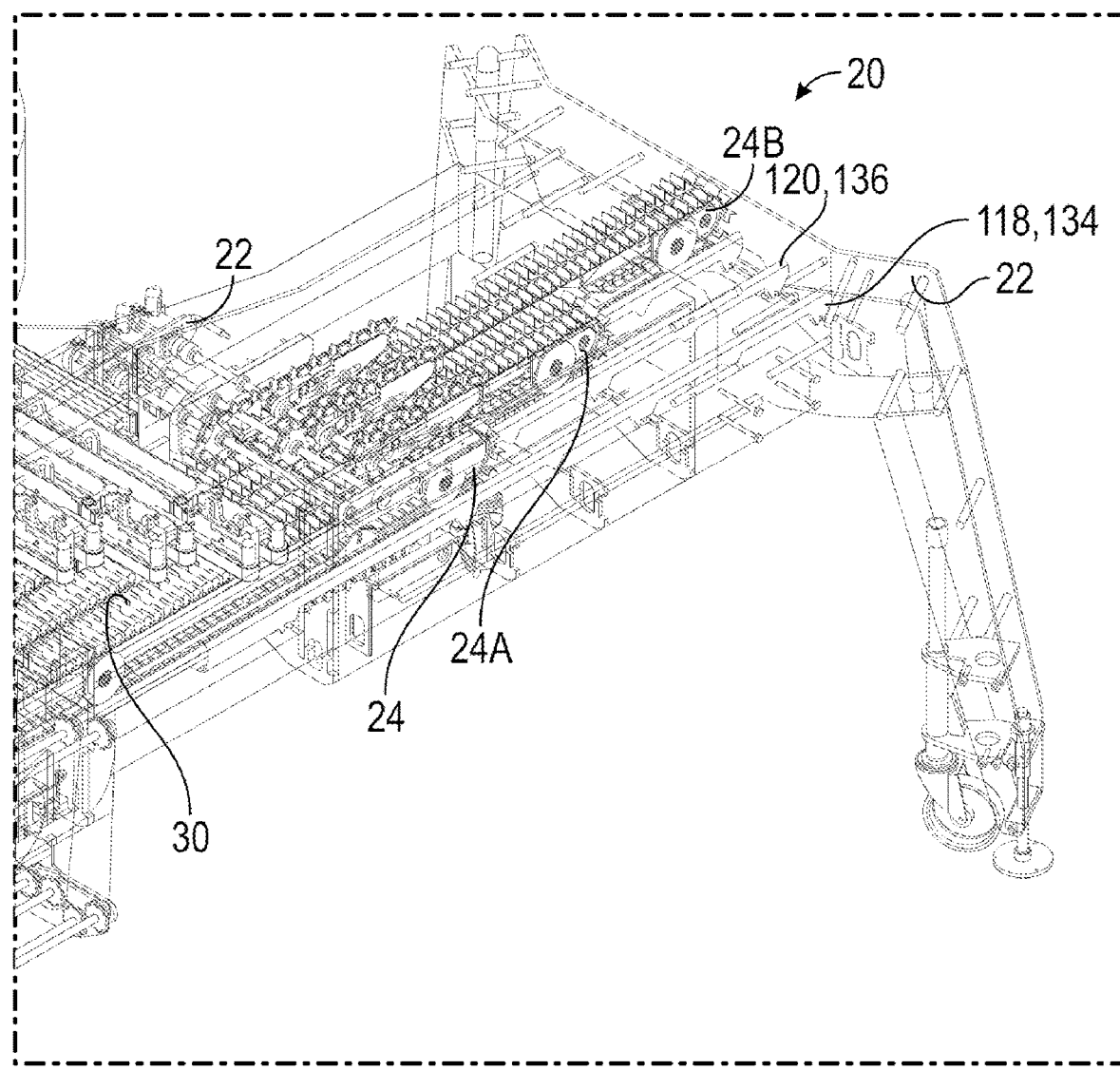
FIG. 3 is a detail perspective view from above of the food article loading system of FIG. 1 showing the housing in phantom and the shuttle conveyors.
Figure 4:
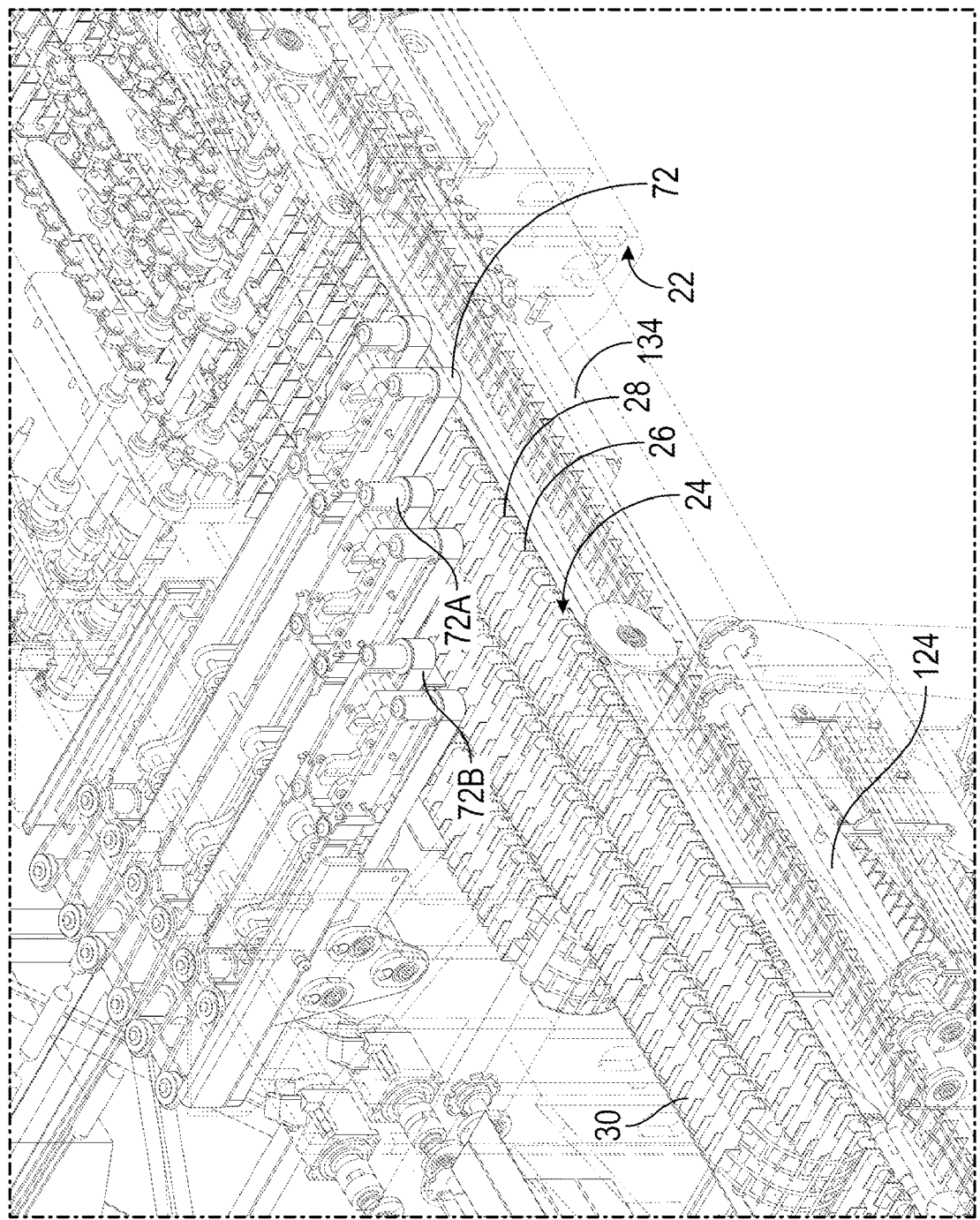
FIG. 4 is a detail perspective view from above of the food article loading system of FIG. 1, showing the shuttle conveyors and portions of the upper and lower sliding gates.

As shown in FIGS. 1, 2, and 3, the upper drive 36 and the lower drive 38 engage the rollers 164, 166 along the belt centerline A of the first belt 26 between the side plates 160, 162 of the paddle units 158 (see FIGS. 5A-5C). The upper drive 36 and the lower drive 38 each include an endless driven lug chain 174, 176, respectively, having outwardly projecting lugs 178 that engage the rollers 164, 166 and/or bushings 172 of the roller chain between aligned ones of the paddle segments 168, 170. The lug chains 174, 176 extend about lug plates 178, 180 and include drive sprockets 182, 184 driven by actuators 52 (and 52A, 52B for upper drives 36A, 36B, respectively) and 54 (see also FIG. 8) for lower drive 38, all mounted on the housing 22. In an exemplary embodiment, and as shown in FIGS. 1 and 6, the shuttle conveyor 24 includes a shuttle frame 186 extending between front and rear idler pulleys 188, 190, and the first belt 26 extends about the front and the rear idler pulleys. A shuttle cage 192 is mounted on the shuttle frame 186 and is shaped in a curved contour to conform to the curve of the first belt 26 around the rear idler pulley 190 to retain food articles 30 on a portion of the first belt passing around the rear pulley. The disk-shaped wheels 156 are rotatably mounted on the shuttle frame 186.

In an exemplary embodiment, the control 50 (FIG. 2) is programmed to actuate the upper drive 36, and in further embodiments, upper drives 336A and/or 36B, to rotate and hold the lower drive 38 fixed to simultaneously displace the shuttle conveyor 24 longitudinally in a first direction relative to the housing 22, and rotate the first belt 26 to collect the food articles 30 on the upper pass 32 of the first belt and convey the food articles from the upper pass to the lower pass 34 of the first belt. The control 50 also may be programmed actuate the upper drive 36 and the lower drive 38 to rotate in the same direction to displace the first belt 24 longitudinally in a second, opposite direction to convey food articles 30 on the lower pass 34 of the first belt to the second belt 42 of the loading head 40.

In summary, in an embodiment of the food article loading system 20 an accumulator, which in embodiments may take the form of the shuttle conveyor 24, receives and accumulates individual food articles 30 thereon, and discharges the food articles therefrom. The loading head 40 includes a second belt 42 with a plurality of paddles 44 for receiving the food articles 30 from the accumulator. The second belt 42 has an upper pass 46 and a lower pass 48. The loading head 40 has a front guide 58 at a food article receiving end and a rear guide 60. The front guide 58 has a larger radius of curvature than a radius of curvature of the rear guide. The second belt 42 of the loading head 40 extends around the front guide 58 and the rear guide 60 such that a spacing between adjacent ones of the paddles 44 of the second belt 42 splay outwardly at a point 62 where the second belt first engages the front guide to receive the food articles 30 discharged from the accumulator. A control 50 is connected to actuate each of the accumulator 24 and the belt of the loading head to operate at selected speeds, thereby causing the accumulator 24 to receive and retain a predetermined number of food articles 30 for a predetermined time interval (see e.g., FIG. 1), and to deposit a second predetermined number of food articles onto the second belt (see e.g., FIG. 6, food articles on upper surface 86 of upper sliding gate 78) at a selected frequency, so that the loading head receives the food articles in the paddles of the second belt in predetermined spaced groupings.

The upper sliding gate 78 may be positioned to receive the food articles 30 from below the lower pass 48 of the second belt 42. The upper sliding gate 78 includes an actuator 80 activated by the control 50 for alternately opening to allow the food articles 30 received from the loading head 40 in the predetermined spaced groupings to fall downwardly and closing to receive and collect the food articles from the loading head in the predetermined spaced groupings. A lower sliding gate 98 is positioned below the upper sliding gate 78 to receive the food articles 30 from the upper sliding gate in the predetermined spaced groupings when opened, wherein the lower sliding gate includes an actuator 104 activated by the control 50 for alternately opening to allow the food articles received from the upper sliding gate to fall downwardly in the predetermined spaced groupings into individual receptacles 100 corresponding to the predetermined spaced groupings, and closing to receive and collect the food articles 30 from the loading head 40.

In an exemplary embodiment, the method for loading food articles 30 into receptacles begins with receiving and accumulating the food articles 30 in an accumulator, such as the shuttle conveyor 24 and/or shuttle conveyors 24A, 24B. The food articles 30 are discharged from the accumulator in predetermined, spaced groupings into a loading head 40. The food articles 30 are received seriatim in preselected groupings from the accumulator at a food article receiving end or opening 66 in paddles 44 of an endless belt 42 of a loading head 40 extending about a front guide 58 and a rear guide 60. The front guide 58 has a larger radius of curvature than a radius of curvature of the rear guide 60, and a spacing between adjacent ones of the paddles 44 of the endless belt 42 splay outwardly at a point 62 where the endless belt first engages the front guide to define a food article receiving opening 66 to receive the food articles discharged from the accumulator 24.

The food articles 30 are conveyed in the preselected groupings on the second belt 42 to a lower pass 48 of the belt to an upper slide gate 78. The control 50 synchronizes the movement of the second belt 42 relative to the movement of the accumulator or first belt 24 to space the food articles 30 in the preselected groupings on the upper slide gate 78. The control 50 opens the upper slide gate 78 to allow a first preselected collection of groupings of food articles 30 to fall into a divider tray 92 that maintains the preselected groupings of food articles 30 supported upon a lower slide gate 98. The control 50 opens the lower slide gate 98 to allow the first preselected collection of groupings of food articles 30 to fall into discrete packages 106.

In embodiments, receiving and accumulating the food articles 30 in an accumulator includes receiving the food articles seriatim between spaced paddles 28 on an upper pass 32 of a first belt 24 of a shuttle conveyor 24 by simultaneously displacing the shuttle conveyor longitudinally and rotating the first belt to convey the food articles to a lower pass 34 of the first belt. Also in embodiments, the method further includes subsequently opening the upper slide gate 78 to allow a second preselected collection of groupings of food articles 30 to fall into the divider tray 92 on top of the first preselected collection of groupings of food articles; and opening the lower slide gate 98 includes opening the lower slide gate to allow the first and the second preselected collection of groupings of food articles to fall into discrete packages 106.

Figure 11:
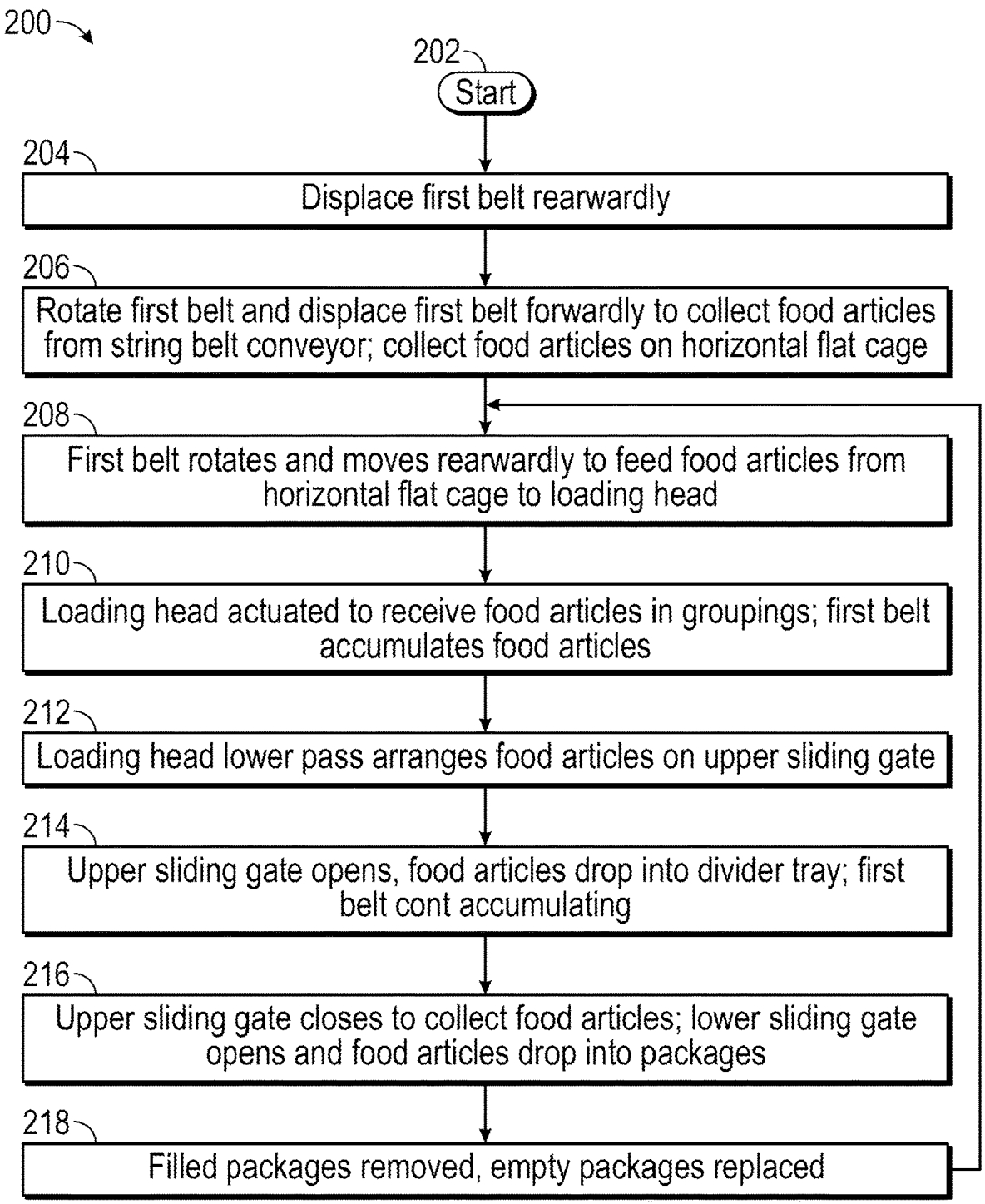
FIG. 11 is a flow chart showing the process depicted in FIGS. 7A-7L.

In another exemplary embodiment, shown in FIGS. 7A-7L and represented in flow chart 200 of FIG. 11, the process begins as in FIG. 7A and in block 202, 204 in which the control 50 actuates the upper drive 36 to rotate in a clockwise direction and the lower drive 38 to rotate in a counterclockwise direction, thereby displacing the first belt 26 rearwardly (to the left in FIG. 7A). The upper drive 38 then is actuated to rotate counterclockwise and the lower drive 38 is fixed, so that the first belt 26 simultaneously rotates clockwise and is displaced forwardly (to the right in FIG. 7B) at a rate that receives food articles 30 from string belt conveyor 72 in individual paddles 28. This results in the food articles collecting along the length of the horizontal flat cage 76 from the article receiving opening 66, as indicated in block 206.

Figure 7C:
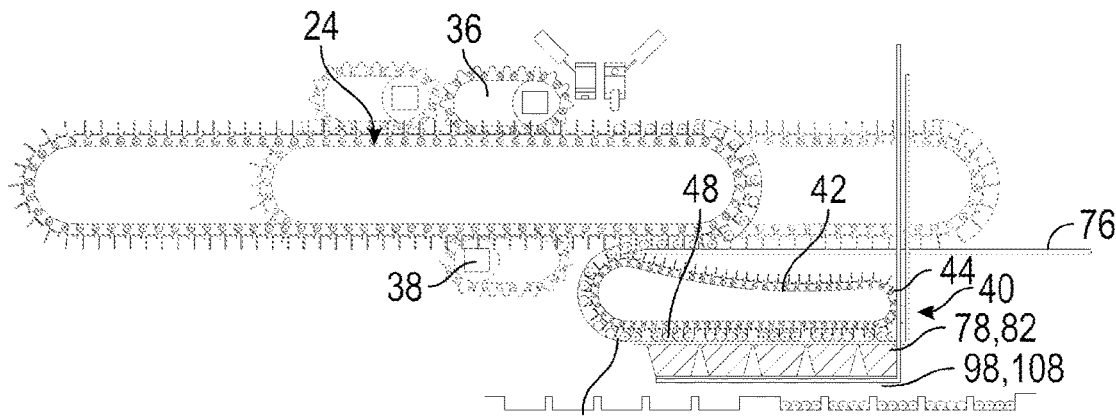
Figure 7D:
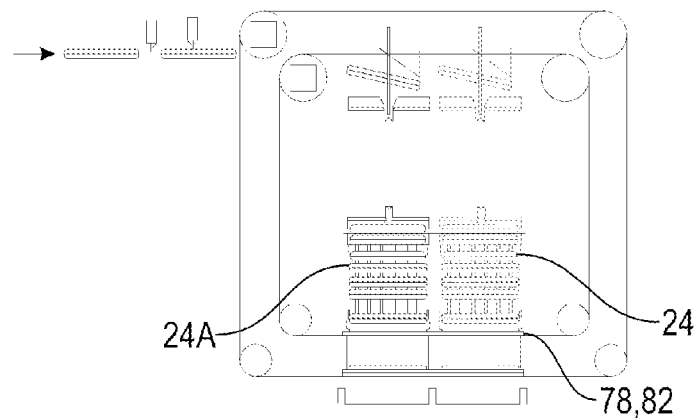

As shown in FIGS. 7C and 7D, and in blocks 208, 210, and 212, the control 50 actuates the upper drive 36 and lower drive 38 to displace the first belt rearwardly, and simultaneously, the control 50 actuates the second belt 42 to rotate counterclockwise to collect groupings of food articles 30 between the paddles 44 and convey them to the lower pass 48, where they are supported on the panels 82 of the upper sliding gate 78. As shown in FIG. 7C, the food articles 30 are arranged on the panels 82 in groupings of four.

Figure 7E:
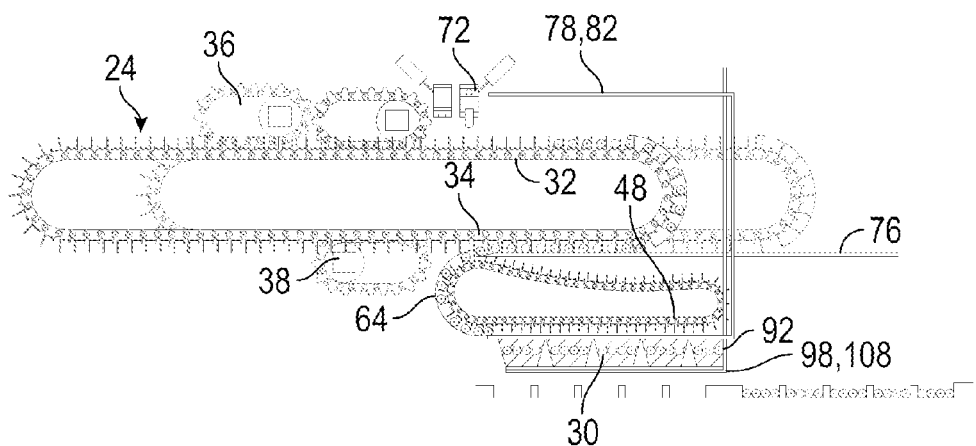
Figure 7F:
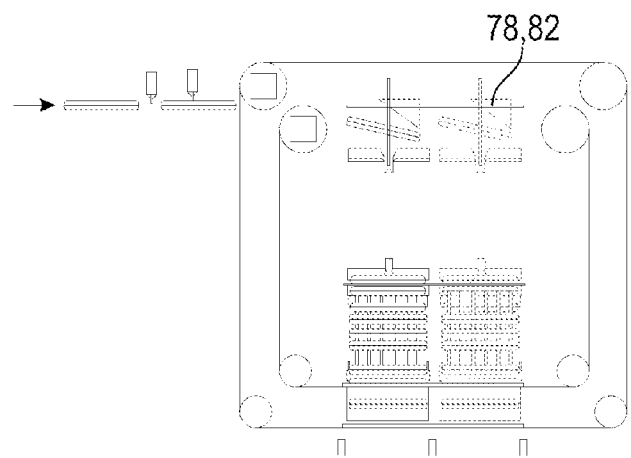

As shown in FIGS. 7E and 7F, and in block 214, the control 50 actuates the upper sliding gate 78 to an open configuration, which allows the food articles 30 previously supported thereon to fall downwardly into the divider tray 92. This is accomplished while subsequent groupings of food articles are retained on the second belt by the slide guide 64. At the same time, the shuttle conveyor 24 is receiving food articles 30 from the string belt conveyors 72 on the upper pass 32, the upper and lower drives 36, 38 are actuated to simultaneously rotate and displace the first belt 24 to collect food articles 30 on the upper pass 32 and arrange them on the horizontal flat cage 76.

Figure 7G:
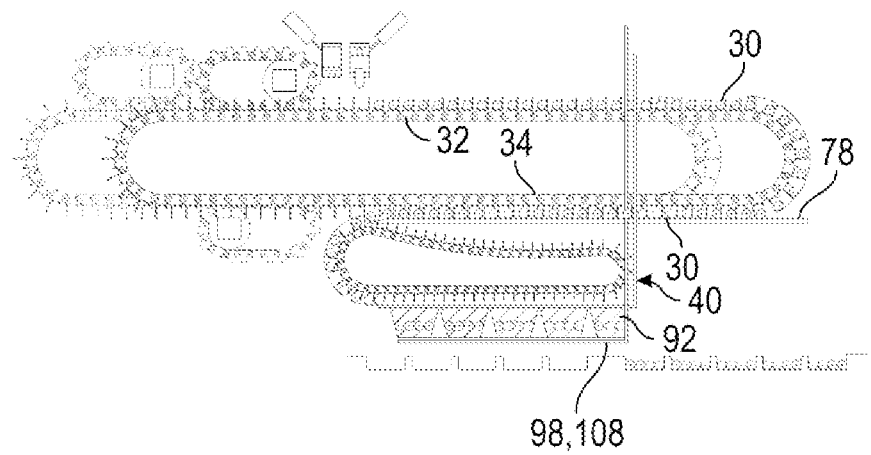
Figure 7H:
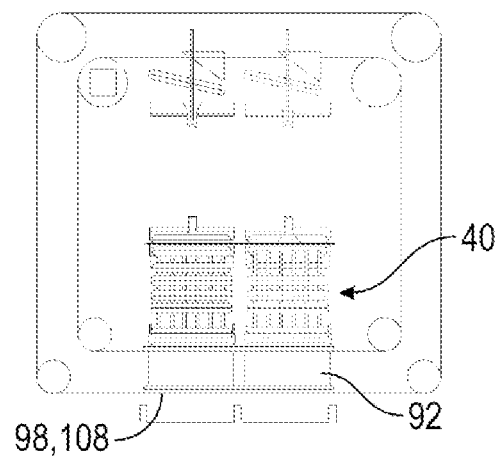
Figure 7I:
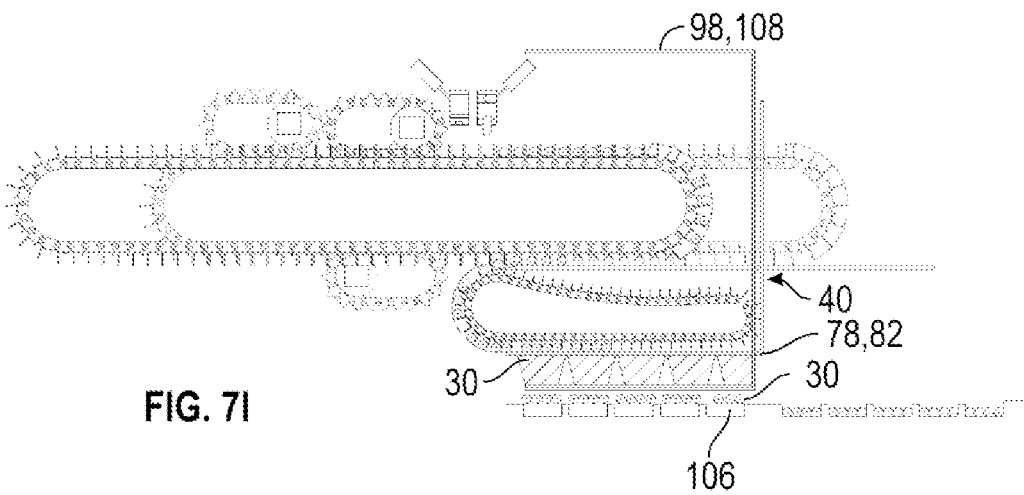
Figure 7J:
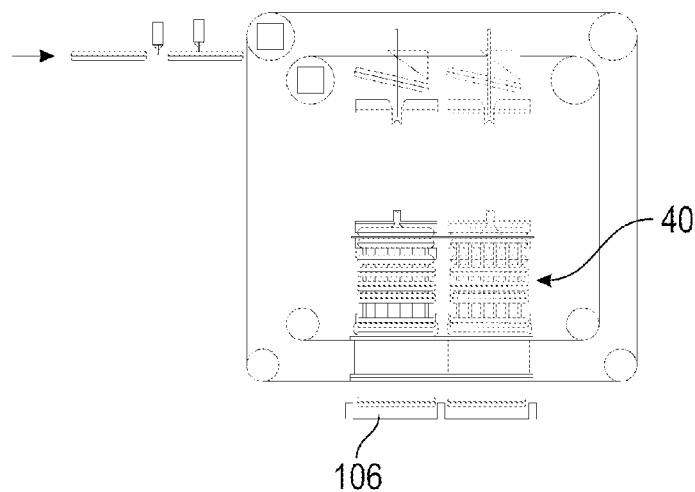

As shown in FIGS. 7G and 7H, the control 50 actuates the upper and lower drives 36, 38 to continue to receive food articles 30 on the upper pass 32 of the first belt 26 and arrange food articles 30 on the horizontal flat cage 78 as the food articles previously collected on the upper sliding gate panels continue to fall into the divider tray 92, where they rest upon the panels 108 of the lower sliding gate 98. As shown in FIGS. 7I and 7J, and indicated in block 216, the control next actuates the lower sliding gate 98 to move the panels 108 to an open configuration, which allows the food articles 30, which are arranged in groupings by the divider tray, to fall down into the packages 106, where they may be removed and sealed for shipment, as indicated in block 218. At the same time, the upper sliding gate 78 is actuated by the control 50 to a closed position, which allows the control to actuate the loading head 40 to deposit food articles 30 on the panels 82 in preselected groupings.

Figure 7K:
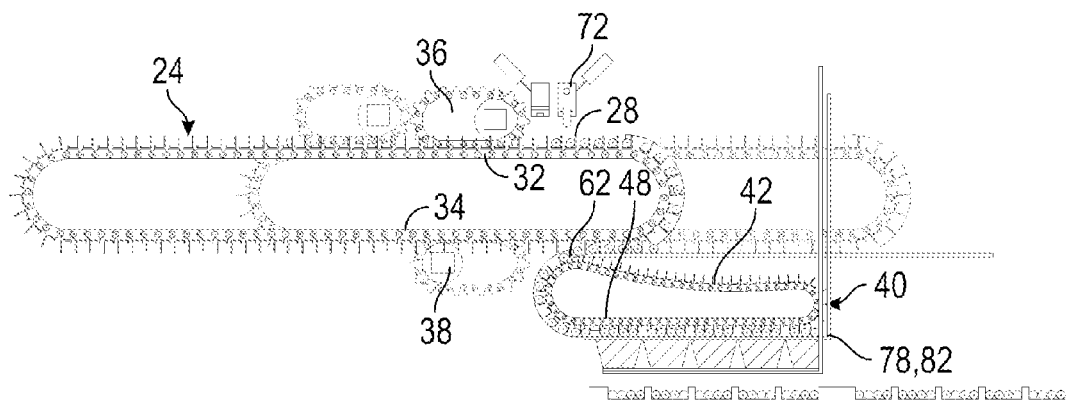
Figure 7L:
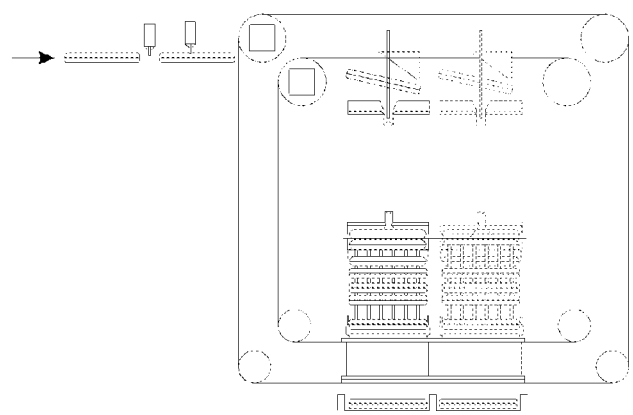

As shown in FIGS. 7K and 7L, the process continues as also shown in FIGS. 7C and 7D, and described in block 208, with the shuttle conveyor 24 receiving food articles 30 on the upper pass 32 from the string belt conveyor 72, and conveying them to the lower pass 34, where they are arranged on the horizontal flat cage 76. As shown in FIGS. 7A-7L, the control 50 actuates the upper and lower drives 36, 38 to simultaneously rotate the first belt 26 and displace it to continuously present empty paddles 28 to receive food articles from the string belt conveyor 72 to receive the continuous stream of food articles therefrom.

The foregoing description of the operation of the system 20 with reference to FIGS. 7A-7L is limited to a single arrangement of a shuttle conveyor 24, upper and lower drives 32, 34, and loading head 40. It is to be understood that the system 20 is scalable, and that the control 50 can be programmed to actuate two, three, or more arrangements of such components, placed closely together as shown in FIGS. 1-4, for example, for shuttle conveyors 24, 24A, 24B.

The disclosed apparatus and method present an efficient loading system that is capable of managing a relatively high input feed rate, possesses a relatively small footprint, and is relatively easy to reconfigure to accommodate food article packing of a variety of sizes and configurations. The disclosed system and method constitute but one embodiment of the invention. It is to be understood that the invention is not limited to these precise systems and methods, and that changes may be made therein without departing from the scope of the invention.

What is claimed is:
1. A food article loading system, comprising:
a housing;
a shuttle conveyor having a first belt with a first plurality of paddles for receiving individual food articles, the first belt having an upper pass and a lower pass, the shuttle conveyor mounted on the housing for relative longitudinal, reciprocal movement;
an upper drive engaging the upper pass of the shuttle conveyor;
a lower drive engaging the lower pass of the shuttle conveyor;
a loading head having a second belt with a second plurality of paddles for receiving the food articles from the lower pass of the shuttle conveyor, the second belt having an upper pass and a lower pass; and a control for actuating each of the upper drive and the lower drive to operate at a selected speed, thereby causing the first belt to rotate about a circular path and the shuttle conveyor to reciprocate longitudinally to receive and retain a first predetermined number of the food articles, and to deposit a second predetermined number of the food articles onto the second belt at a selected frequency;

wherein the loading head includes a front guide at a food article receiving end and a rear guide, the front guide having a larger radius of curvature than a radius of curvature of the rear guide, and the second belt of the loading head extends around the front guide and the rear guide such that a spacing between adjacent ones of the paddles of the second belt splay outwardly at a point where the second belt first engages the front guide to receive the food articles from the lower pass of the first belt of the shuttle conveyor.

2. The loading system of claim 1, wherein the loading head includes a slide guide extending about and spaced from the front guide to retain the food articles in the paddles of the second belt as the paddles of the second belt pass between the front guide and the slide guide, an upper portion of the slide guide forming a food article receiving opening with the second belt.

3. The loading system of claim 2, wherein the rear guide is a drive sprocket, and the front guide includes an idler sprocket and fixed guide plates; and the system further comprises a loading head actuator connected to rotate the drive sprocket.

4. The loading system of claim 3, wherein a pitch of the paddles of the first belt is greater than a pitch of the paddles of the second belt of the loading head.

5. The loading system of claim 4, further comprising a horizontal flat cage positioned beneath the lower pass of the first belt and spaced to retain the food articles between the paddles of the lower pass of the first belt, the horizontal flat cage terminating at the food article receiving end of the loading head adjacent the slide guide and forming the food article receiving opening with the slide guide and the paddles of the second belt.

6. The loading system of claim 5, further comprising an upper sliding gate positioned below the lower pass of the second belt to receive the food articles from the loading head; and a first actuator activated by the control for alternately opening the upper sliding gate to allow the food articles received from the loading head and supported upon an upper surface of the upper sliding gate to fall downwardly, and closing the upper sliding gate to receive and collect additional ones of the food articles from the lower pass of the second belt of the loading head.

7. The loading system of claim 6, further comprising a divider tray, fixed below the upper sliding gate to receive the food articles from the upper sliding gate, and including dividers for dividing the received food articles into predetermined groupings; a lower sliding gate positioned below the divider tray to support the received food articles in the divider tray; and a second actuator activated by the control for alternately opening the lower sliding gate to allow the food articles in the divider tray to fall downwardly into individual receptacles, and closing the lower sliding gate to receive and collect the food articles from the loading head.

8. The loading system of claim 7, wherein the upper sliding gate and the lower sliding gate include first plurality of panels and second plurality of panels extending between first parallel chain drive and second parallel chain drive connected to displace the first plurality of panels and the second plurality of panels sidewardly relative to a movement direction of the second belt of the loading head; and the first actuator and second actuator are connected to move the first parallel chain drive and the second parallel chain drive to move the first plurality of panels and the second plurality of panels between an open position and a closed position of the first plurality of panels and the second plurality of panels.

9. The loading system of claim 8, wherein the housing includes a pair of forward rails, and the shuttle conveyor is movably mounted on the pair of forward rails.

10. The loading system of claim 9, wherein the loading head includes a frame that supports the drive sprocket, the idler sprocket, and the fixed guide plates; and wherein the frame is supported for slidable movement on the housing.

11. The loading system of claim 10, wherein the frame includes a pair of rearward rails connected to the pair of forward rails to form a pair of continuous shuttle rails for the relative longitudinal reciprocal movement of the shuttle conveyor.

12. The loading system of claim 11, wherein the horizontal flat cage, the upper sliding gate, and the lower sliding gate are attached to the frame.

13. The loading system of claim 12, wherein the pair of forward rails and the pair of rearward rails each include outwardly facing beveled bearing surfaces; and the shuttle conveyor includes disk-shaped wheels that ride along the beveled bearing surfaces and support the shuttle conveyor, whereby the beveled bearing surfaces center the shuttle conveyor between the pair of forward rails and the pair of rearward rails.

14. The loading system of claim 13, wherein the first belt is a roller chain having a plurality of paddle units, each of the paddle units including a pair of opposing side plates parallel to and on either side of a belt longitudinal centerline, and joined by front relatively rotatable roller and rear relatively rotatable roller, each side plate having a paddle segment extending sidewardly from the belt centerline, such that the paddle segments of the opposing side plates align to form a paddle that supports one of the food articles; and wherein the first belt is an endless belt comprised of interconnected paddle units.

15. The loading system of claim 14, wherein the upper drive and the lower drive engage the front relatively rotatable roller and the rear relatively rotatable roller along the belt centerline between the side plates.

16. The loading system of claim 14, wherein the upper drive and the lower drive each include an endless driven lug chain having outwardly projecting lugs that engage the front relatively rotatable roller and the rear relatively rotatable roller of the roller chain between aligned ones of the paddle segments.

17. The loading system of claim 16, wherein the shuttle conveyor includes a shuttle frame extending between front idler pulley and rear idler pulley, such that the first belt extends about the front idler pulley and the rear idler pulley, a shuttle cage mounted on the shuttle frame and shaped to conform to a curve of the first belt around the rear pulley to retain the food articles on a portion of the first belt passing around the rear pulley; and wherein the wheels are rotatably mounted on the shuttle frame.

18. The loading system of claim 1, wherein the control is programmed to actuate the upper drive to rotate and hold the lower drive fixed to simultaneously displace the shuttle conveyor longitudinally in a first direction relative to the housing, and rotate the first belt to collect the food articles on the upper pass of the first belt and convey the food articles from the upper pass to the lower pass of the first belt; and/or is programmed actuate the upper drive and the lower drive to rotate in a same direction to displace the first belt longitudinally in a second direction to convey food articles on the lower pass of the first belt to the second belt of the loading head.

\* \* \* \* \*